No. 668,343. Patented Feb. 19, 1901.
A. E. ROE.
CIRCULAR GANG SAW MILL.
(Application filed Oct. 11, 1899. Renewed Sept. 28, 1900.)
(No Model.) 2 Sheets—Sheet 1.
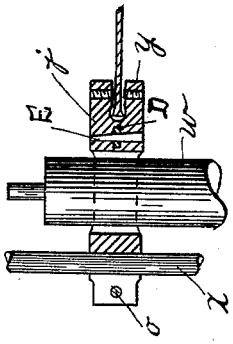
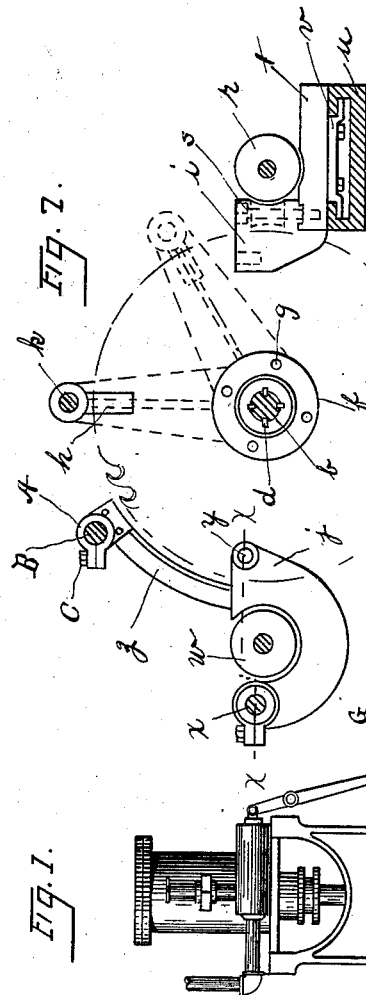
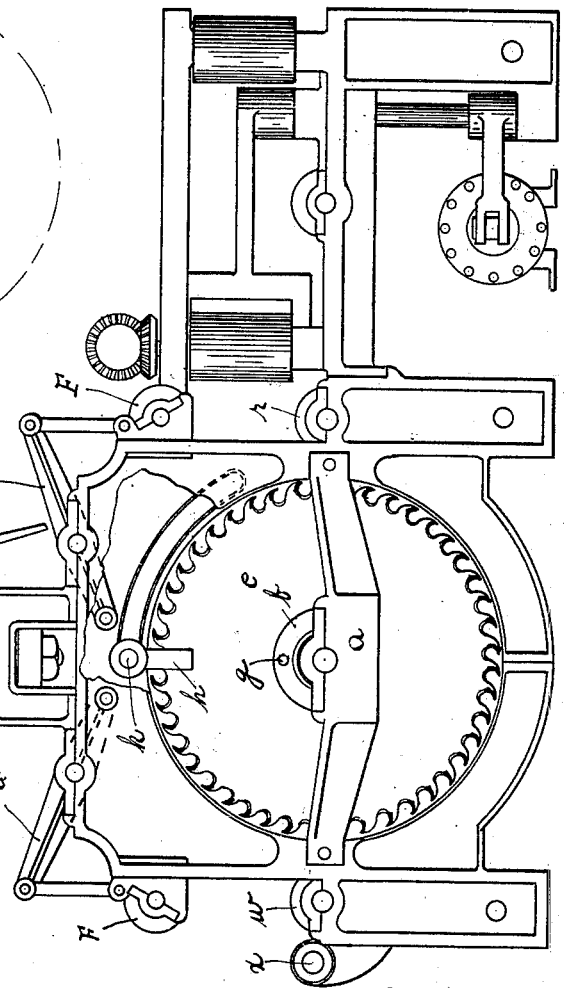
Witnesses
W. R. Daniels
Geo. A. Daniels
Inventor
A. E. Roe
By his Attorney
Bruce Cornwall
THE NORRIS PETERS CO., PHOTO-LITHO., WASHINGTON, D. C.

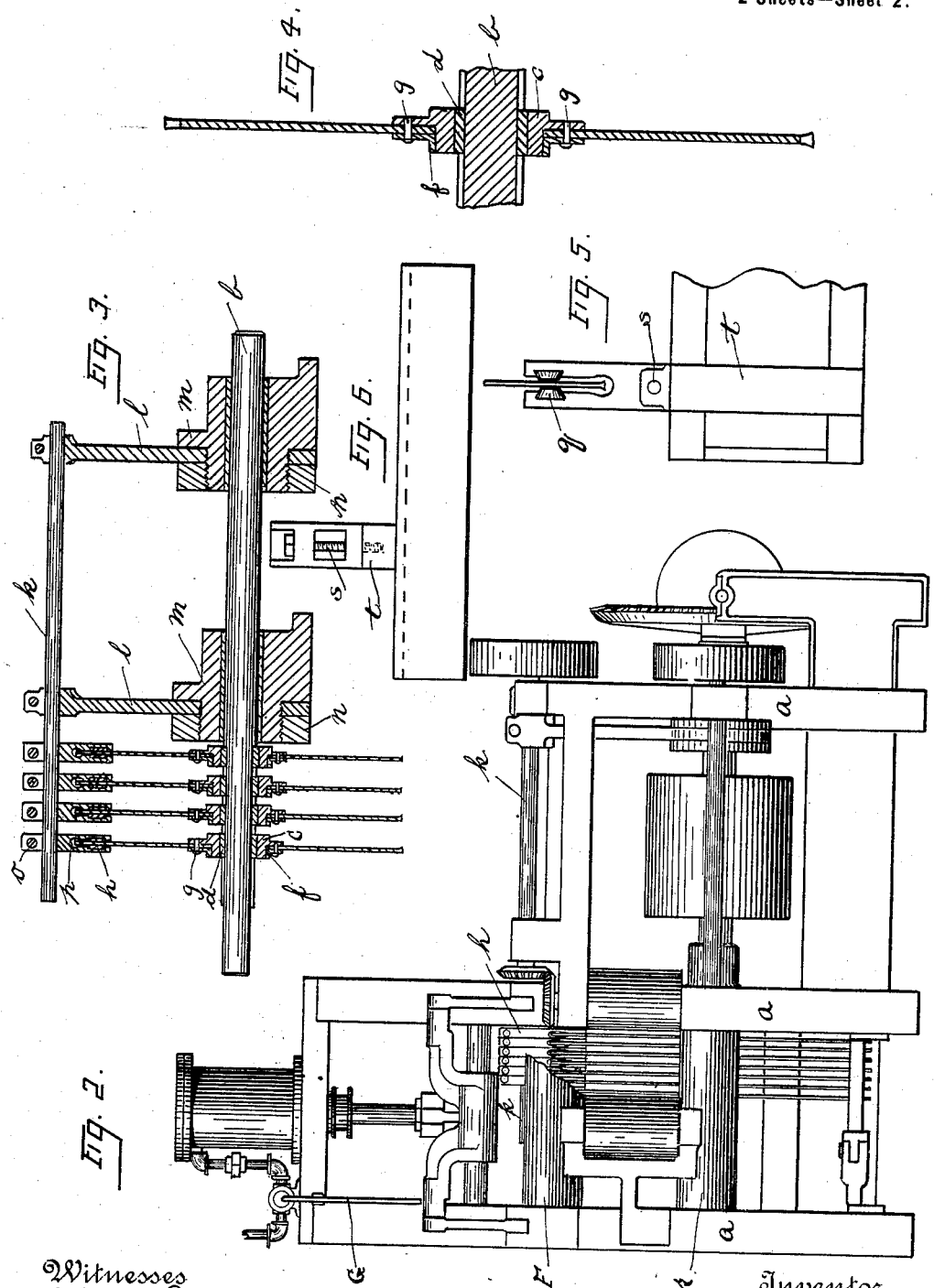

UNITED STATES PATENT OFFICE.

ALPHEUS E. ROE, OF NEW WHATCOM, WASHINGTON.

CIRCULAR-GANG-SAW MILL.

SPECIFICATION forming part of Letters Patent No. 668,343, dated February 19, 1901.

Application filed October 11, 1899. Renewed September 28, 1900. Serial No. 31,466. (No model.)

*To all whom it may concern:*

Be it known that I, ALPHEUS E. ROE, a citizen of the United States, residing at New Whatcom, in the county of Whatcom and State of Washington, have invented certain new and useful Improvements in Circular-Gang-Saw Mills, of which the following is a specification.

My invention relates to improvements in circular-gang-saw mills, the object of my invention being to provide means whereby circular saws may be successfully operated in numbers of one or more saws mounted on the same arbor.

My invention therefore resides in the novel construction, combination, and arrangement of parts for the above end hereinafter fully specified, and particularly pointed out in the claims.

In the accompanying drawings, Figure 1 is a side elevation of a circular-gang-saw mill constructed in accordance with my invention. Fig. 2 is a front view of the same, partly in section. Fig. 3 is a longitudinal section through the saw-arbor. Fig. 4 is an enlarged view of a saw, showing the manner of attachment to the arbor. Fig. 5 is a top plan view of a front lower guide. Fig. 6 is a front view of the same. Fig. 7 is a transverse section, and Fig. 8 is a section on the line X X of Fig. 7.

Referring to the drawings, it will be seen that upon a frame $a$ is mounted the saw-arbor $b$, driven from any suitable source or power. Upon said arbor are mounted the saw-collars $c$. Said collars can slide longitudinally on said arbor, but are driven thereby through steel feathers $d$, engaging said arbor and collars. Against said collars $c$ are held the circular saws $e$ by followers $f$, secured to said collars by bolts $g$ through the followers, saws, and collars. Thus it will be seen that said circular saws are driven rotarily by said arbor, while capable of free longitudinal motion thereon, and the saws are removably held by said collars.

The saws are moved longitudinally along the arbor to vary the distance between the saws for cutting lumber of different dimensions, and in order to maintain the cutting edges of the saw in the desired position there are provided guides $h$ $i$ $j$. The guides $h$ are mounted on the projecting end of a guide-bar $k$, carried by arms $l$, mounted on the journals $m$ of the saw-arbor, said arms $l$ being clamped in any desired position on said journals by means of clamp-nuts $n$, secured onto said journals. On said guide-bar $k$ the guides $h$ can be moved longitudinally to any desired position and there clamped by the clamp-screws $o$ through the split upper portions of the guides. The lower portion of each guide $h$ is slit upward, as at $p$, to admit the edge of the saw, said slit being enlarged to permit the saw-teeth to pass therethrough freely, but carrying bearing-blocks $q$, engaging the surface of the saw behind said teeth.

Since the arms $l$ are adjustable about the axis of rotation of the saws, the guides $h$ can be raised or lowered, as desired, according to the thickness of the timber that is being sawed, so that said guides $h$ shall always be immediately above the upper surface of the timber. The guides $i$, like the guides $h$, are slit to receive the edge of the saw and have the bearing-blocks $q$, and they are longitudinally adjustable beneath the horizontal feeding-in roller $r$. For this purpose each guide $i$ is secured by a bolt $s$ to a plate $t$, and said plates are longitudinally adjustable along an undercut frame $u$ by means of clamp-pieces $v$. In like manner there are provided guides $j$ immediately behind the rear edge of the saw and in front of the lower carrying-out roller $w$. Said rear guides $j$ are curved to extend underneath the carrying-out roller $w$ and are adjustably clamped on a rod $x$ at their rear ends. At their front ends they carry bearing-blocks $y$, adjustable by being screwed into said guides on opposite sides of the slit or recess which receives the saw. Thus the guides $h$ $i$ $j$ hold the peripheries of the saws at three points—one immediately above the cut and two below the cut—and thus they at all times hold the edge of each saw in perfect alinement. At the same time the center of the saw is free to play, within certain limits, endwise on the arbor.

At the back of the gang of saws are adjustably mounted the steel spreader-blades $z$. These blades separate and hold apart the pieces of lumber which have just been sawed and are passing out between the saws, and they effectually prevent the engagement with the lumber of the edges of the saw. Their upper ends are secured to split hubs A, longitudinally moved on a stationary bar B, thus being adjustable for various thicknesses of lumber and being clamped by the clamp-screw C. The lower ends of said blades are let into sockets D in the guides and are secured there by taper pins E.

The top pressure-rollers F, operated by mechanism G for raising and lowering, are arranged to exert suitable pressure on the surface of the lumber to hold the same securely to the feed-rollers to feed to the saws.

The guides are so arranged that they may be quickly detached from their fastenings, and each saw being mounted loosely upon the saw-arbor by means of the collars and feathers the rapid changing of the saws is facilitated, so that after becoming dull they may be replaced with a set of sharp saws in a few moments.

I claim—

1. In a circular-gang-saw mill, the combination of a saw-arbor, saws rotated thereby but movable therealong, guides engaging the saws at their peripheries only said guides being movable along said peripheries in circles about the arbor as center, and means for longitudinally adjustably securing said guides, substantially as described.

2. In a circular-gang-saw mill, the combination of a saw-arbor, circular saws rotated thereby but movable therealong, a swinging yoke on said arbor, guides carried by said yoke and engaging the saws at their peripheries, and means for adjusting said guides, substantially as described.

3. In a circular-gang-saw mill, the combination of a saw-arbor, circular saws rotated thereby but movable therealong, guides engaging said saws at their peripheries only, spreaders behind said guides to spread the sawed lumber and means for simultaneously adjusting longitudinally said spreaders and guides, substantially as described.

4. In a circular-gang-saw mill, the combination of an arbor, collars thereon and feathers for driving the collars, saws bolted to said collars, longitudinally-adjustable guides engaging the same at their peripheries only, and longitudinally-adjustable spreaders each guide and its corresponding spreader being connected to move in unison, substantially as described.

In witness whereof I have hereunto set my hand in the presence of two subscribing witnesses.

ALPHEUS E. ROE.

Witnesses:
C. A HORST,
W. P. FOWLE.